(12) United States Patent
Venkatasubramanian et al.

(10) Patent No.: US 9,484,740 B2
(45) Date of Patent: Nov. 1, 2016

(54) ELECTROSTATIC DISCHARGE CLAMP

(71) Applicant: Broadcom Corporation, Irvine, CA (US)

(72) Inventors: Ramachandran Venkatasubramanian, Chandler, AZ (US); Kent Charles Oertle, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 334 days.

(21) Appl. No.: 14/183,903

(22) Filed: Feb. 19, 2014

(65) Prior Publication Data

US 2015/0138679 A1    May 21, 2015

Related U.S. Application Data

(60) Provisional application No. 61/906,546, filed on Nov. 20, 2013.

(51) Int. Cl.
*H02H 9/00*    (2006.01)
*H02H 9/04*    (2006.01)

(52) U.S. Cl.
CPC ............. *H02H 9/046* (2013.01); *H02H 9/041* (2013.01)

(58) Field of Classification Search
CPC ...................................................... H02H 9/046
USPC ........................................................... 361/56
See application file for complete search history.

(56) References Cited

U.S. PATENT DOCUMENTS

| 6,650,553 | B2 * | 11/2003 | Tsai ................. H02M 3/33523 363/21.07 |
| 7,446,991 | B2 * | 11/2008 | Chen .................. H01L 27/0285 361/56 |
| 8,373,497 | B2 * | 2/2013 | Petruzzi ............. H01L 27/0251 327/534 |
| 8,630,071 | B2 * | 1/2014 | Venkatasubramanian ................ H01L 27/0251 361/56 |
| 9,059,583 | B2 * | 6/2015 | Venkatasubramanian ................ H01L 27/0251 |

OTHER PUBLICATIONS

Ming-Dou Ker, Whole-Chip ESD Protection Design with Efficient VDD-to-VSS ESD Clamp Circuits for Submicron CMOS VLSI, Jan. 1999, IEEE Transactions on Electron Devices, vol. 46, No. 1.*

* cited by examiner

*Primary Examiner* — Stephen W Jackson
(74) *Attorney, Agent, or Firm* — Brinks Gilson & Lione

(57) ABSTRACT

An electrostatic discharge clamp may include a reference generator and a comparator. The electrostatic discharge clamp may be characterized by a time constant. A voltage difference caused by an electrostatic discharge event may activate the electrostatic discharge clamp. The comparator may hold the electrostatic discharge clamp in an active state responsive to a reference voltage provided by the reference generator. A duration of the active state of the electrostatic discharge clamp may facilitate dissipation of the electrostatic discharge event.

20 Claims, 4 Drawing Sheets

ELECTROSTATIC DISCHARGE CLAMP

PRIORITY CLAIM

This application claims priority to U.S. Provisional Application Ser. No. 61/906,546, filed Nov. 20, 2013, which is incorporated herein by reference in its entirety.

TECHNICAL FIELD

This disclosure relates to protecting integrated circuits from electrostatic discharge. This disclosure also relates to electrostatic discharge clamps.

BACKGROUND

Electrostatic discharge (ESD) occurs when unbalanced charges are deposited on an insulating surface causing a standing electromagnetic field. In some cases, ESD may occur when one insulating surface is brought into contact with a second insulating surface. An exchange of the charged particles may occur during contact leaving behind unbalanced charges. The standing electromagnetic fields may lead to breakdown, e.g. arcing. When ESD occurs on integrated circuits, breakdown may result in damage to the integrated circuit. Increased control of ESD occurrence and dissipation may increase the robustness of integrated circuits.

DETAILED DESCRIPTION

The disclosure below concerns techniques and architectures for controlled dissipation of electrostatic discharge (ESD). An ESD clamp may be included in an integrated circuit (IC) to detect and dissipate ESD when present. The ESD clamp may include resistive and capacitive elements, which may be associated with a time constant. The time constant controls the amount of time the ESD clamp remains on to dissipate the electrostatic charge. Further, the time constant may affect the ESD clamp's immunity to noise within the IC. An increased time constant may allow for increased time for charge dissipation. A decreased time constant may improve the ESD clamp noise immunity present in the IC. Further, decreasing resistance and capacitance in a circuit may allow for smaller component and/or IC sizes. Smaller IC sizes may be advantageous in mobile devices. In various implementations, an ESD clamp may decouple on and off circuit operations, which decouples the off-circuit dissipative effects of the ESD clamp from the on-circuit operation. An ESD clamp may be implemented with a reference voltage and a comparator to control on, off, and dissipation operation.

Figure 1:
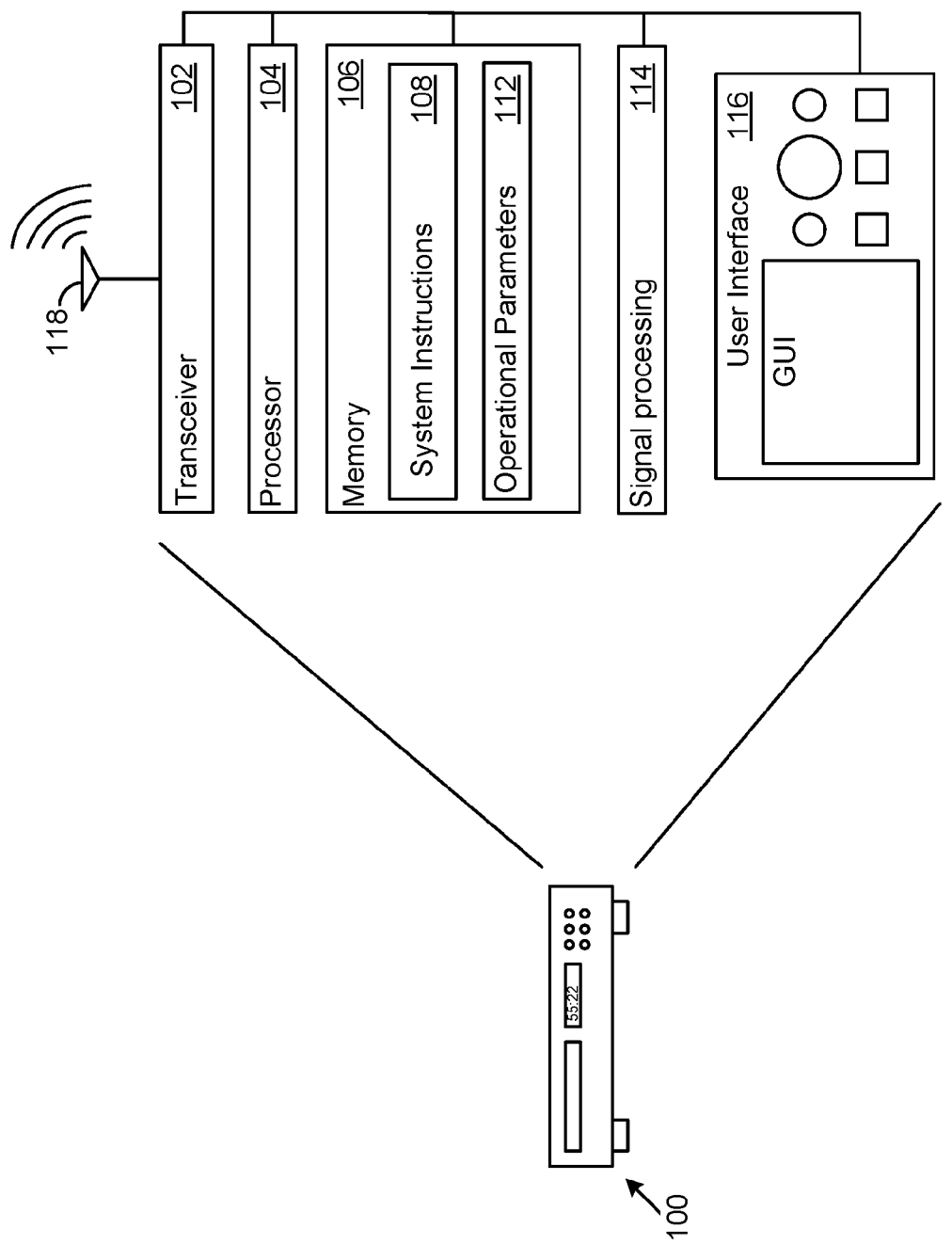
FIG. 1 shows an example device.

The example device described below provides an example context for explaining the techniques and architectures to support ESD dissipation via a reference-comparator ESD (RCESD) clamp. FIG. 1 shows an example device 100. In one example, the device may be a communication device, such as a laptop computer, smartphone, or tablet. However, the device may be virtually any device implementing static-sensitive electrical components. For example, networking hardware, a gaming console, a television set-top box, a sensor array or other IC device.

The device 100 may include a transceiver 102 to support reception and/or transmission of radio frequency or optical signals, and one or more processors 104 to support execution of applications and operating systems, and to govern operation of the device. The device 100 may include memory 106 for execution support and storage of system instructions 108 and operational parameters 112. The communication device 100 may include a user interface 116 to allow for user operation of the device. Signal processing 114 may also be included to handle incoming and outgoing signals. The signal processing circuitry 114 may include detectors and/or other components which may be sensitive to ESD. An RCESD clamp may be included, e.g. within the signal processing circuitry 114 or elsewhere on the device 100, to protect various components of the device 100 from damage via ESD, e.g. breakdown events. For example, the processing circuitry 114 or other parts of the device 100 may include components such as analog-to-digital converters, digital signal processors, processors, logic, and/or other components. An RCESD clamp may be placed across a die included in such components to protect the die from ESD.

Figure 2:
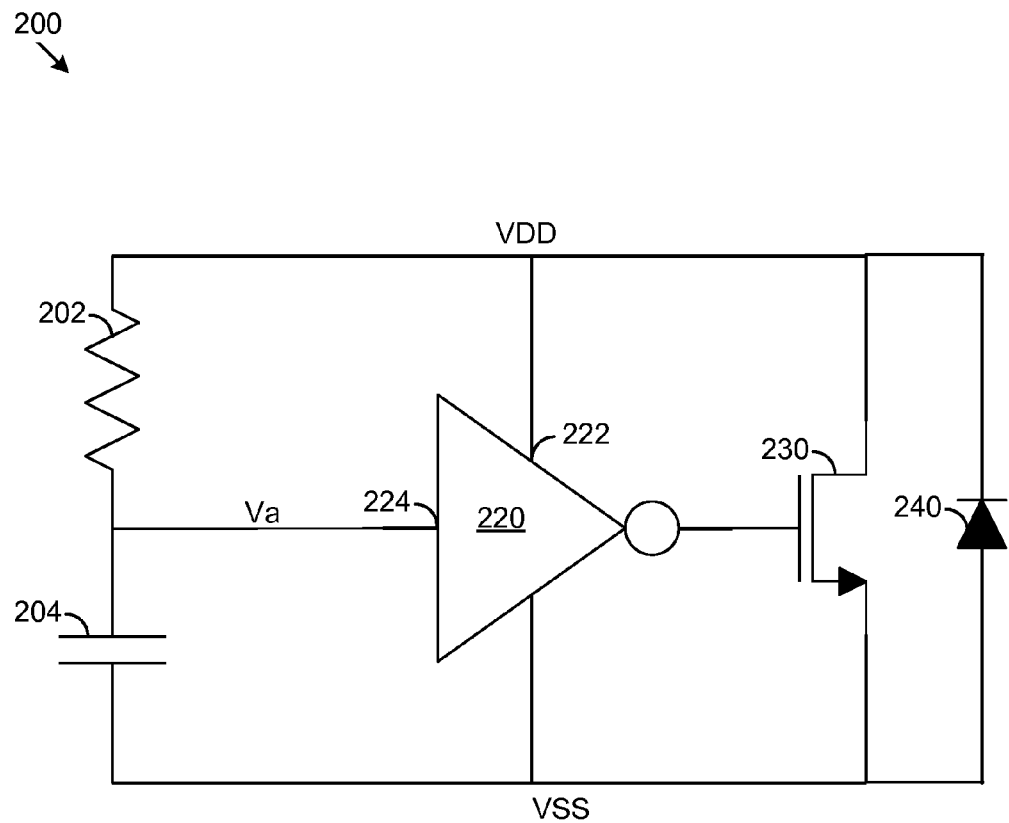
FIG. 2 shows an example electrostatic discharge clamp.

FIG. 2 shows an example ESD clamp 200. The ESD clamp 200 may detect ESD across a supply signal (VDD) and ground (VSS) and act as a closed circuit between VDD and VSS to dissipate the ESD. The ESD clamp 200 may act as a closed circuit on a time scale determined by the time constant of the ESD clamp 200. The resistor 202 and capacitor 204 determine the time constant of the ESD clamp 200. The ESD clamp may be activated when VDD varies at a rate faster than the time constant. When VDD varies, the resistor 202 and capacitor 204 may charge to adjust to the VDD at a rate determined by their time constant. The delay in charging may cause a difference between an initiator signal (Va) and VDD. The difference may cause a voltage difference at ports 222 and 224 of the inverter 220. The inverter 220 may send a signal to activate the gate of transistor 230, activating the ESD clamp 200. When active, the ESD clamp 200 may act as closed circuit and allow current to flow between VDD on VSS. In accord with the time constant, Va and VDD may equilibrate, e.g. become equal to within a tolerance or threshold of one another. The common signal at ports 222 and 224 of the inverter 220 may cause the inverter 220 to deactivate the gate of transistor 230, deactivating the ESD clamp 200. When deactivated, the ESD clamp 200 may not allow current to flow between VDD and VSS.

In some implementations, diode 240 may allow ESD at VSS to be dissipated to VDD via unidirectional current flow via diode 240. Current may not flow from the VDD to VSS via the diode 240.

In some cases, an ESD event across VDD and VSS may not fully dissipate prior to the equilibration of VDD and Va. The ESD event may partially persist and cause damage to the device, e.g. the device 100 operation.

Figure 3:
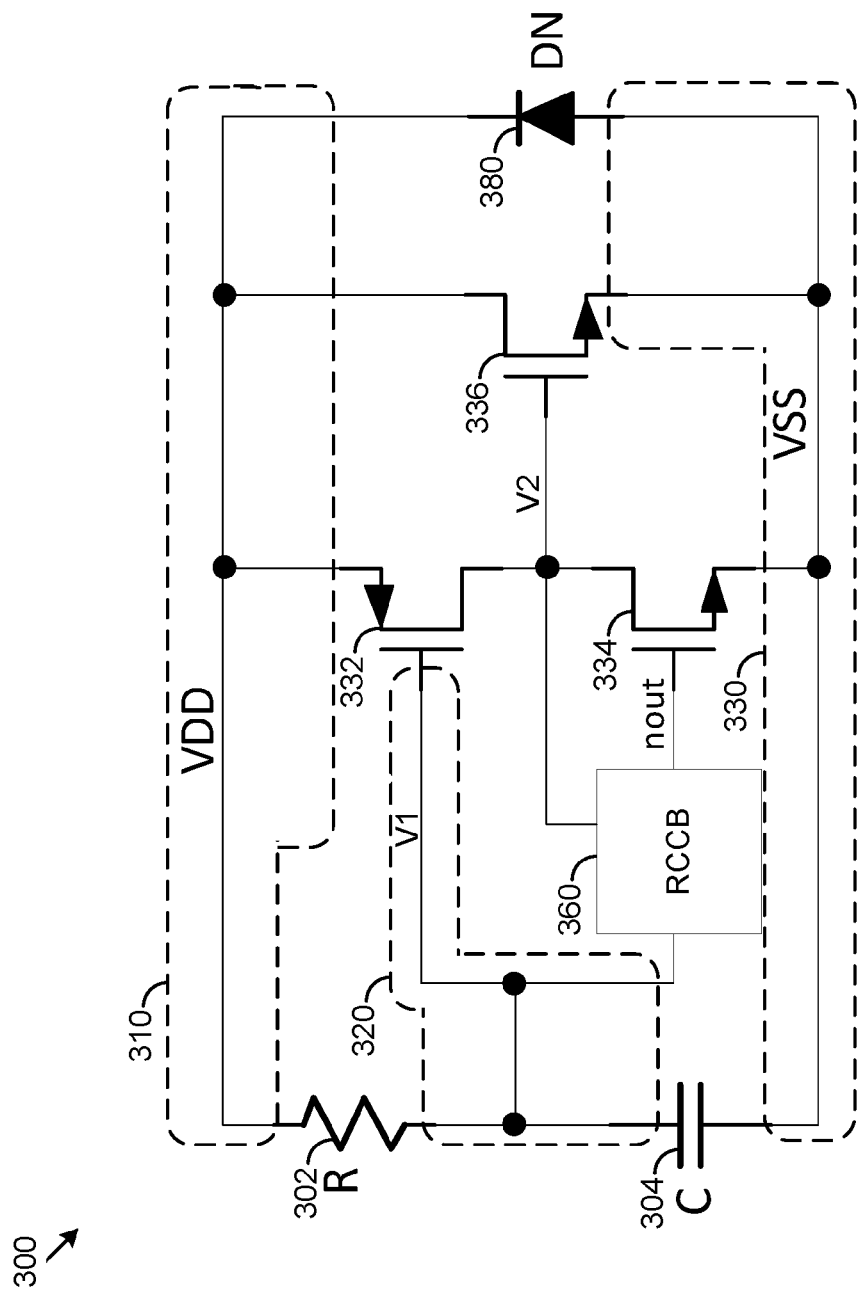
FIG. 3 shows an example reference-comparator electrostatic discharge clamp.

FIG. 3 shows an example RCESD clamp 300. The RCESD clamp 300 may detect ESD along the supply path 310 and act as a closed circuit between the supply path 310 and the ground path 330 to dissipate the ESD event. The RCESD clamp 300 may be implemented with a resistor 302 and capacitor 304 to define a time constant for the RCESD clamp 300. In some cases, the time constant may be set to R·C, where R is the resistance of the resistor 302 and C is the capacitance of capacitor 304. In some implementations, the time constant may be set at a value that is longer that an ESD event and shorter than the time scale of changes that may occur in accord with operation of the device protected by the RCESD clamp. For example, a time constant of 200 ns-2 µs may be longer than an ESD event and shorter than occurrences in accord with operation of the device. In some cases, the human body model ESD source may be used to model an ESD event. For example, an ESD event may have a rise time of 2-10 ns. Potential differences of 100V-10,000V may be present. In some implementations, R and C may be selected such that a clamp may be activated by an event with rate of 50V/ns and may not be activated by an event with a rate of few volts over hundreds of microseconds. An ESD event along the supply path 310 may cause the voltage VDD to change, e.g., experience a significant and fast rise. The resistor 302 capacitor 304 pair may charge in accord with the time constant of the RCESD clamp 300. The delay may cause a difference in the initiator signal (V1) along the initiator path 320 and VDD. The difference in VDD and V1 may cause V1 at the gate of transistor 332 to be lower than the source of transistor 332. This may push the drain gating signal (V2), of transistor 332 high and activate the gate of transistor 336. When V2 goes is pulled high, transistor 336 is placed into conductive state, which may short VDD and VSS. In addition, pushing gating signal V2 high may activate the reference-comparator circuit block (RCCB) 360. In some cases, the RCCB 360 may receive V2 as an input. When activated, the RCCB 360 may hold signal 'nout' low if the signal at V1 falls below a reference. If 'nout' is held low, transistor 334 may not allow current to flow from its source to drain. V2 may be held high and transistor 336 may allow VDD and VSS to equilibrate, dissipating the ESD. V2 may be held high after transistor 332 deactivates in response to VDD and V1 equilibrating. By holding transistor 336 in the conductive state and shorting VDD and VSS, the RCCB 360 may allow the RCESD clamp 300 to fully dissipate ESD when no supply voltage is provided to VDD, e.g. the device 100 is "off". For instance, 'nout' may place transistor 334 in a conductive state, thereby bringing V2 down to VSS. The RCCB 360 stops generating the reference voltage after V2 and VSS equilibrate.

The RCCB 360 may include logic that may prevent the RCESD from locking into an "on" position. For example, if the difference between VDD and V1 is small at the time of initiation, the RCCB 360 may include a failsafe to prevent activation of the RCCB 360 by V2. In some implementations, a low transconductance failsafe transistor within the RCCB 360 may prevent the RCCB 360 from holding 'nout' low when the difference between VDD and V1 is less than a determined threshold. When the difference between VDD and V1 is larger than the determined threshold at the time of initiation the low transconductance of the failsafe transistor may be overcome and the RCCB 360 may activate and hold transistor 336 in an active state allowing VDD and VSS to equilibrate.

For the example RCESD clamp 300, activation and deactivation may be decoupled in some cases. In some implementations, the RCCB may use a fixed reference voltage, e.g. a determined fraction of the device's power supply voltage. The reference may be provided as the signal nout to activate transistor 334 and deactivate the RCESD clamp 300. The example RCESD clamp 300 allows for accurate control of and reduces variation in the deactivation of the RCESD clamp 300. The RCCB 360 may be implemented for consistent performance across varying temperatures, voltages, and IC manufacture. The consistent performance of the RCESD clamp may allow for a reduced time constant. The reduced time constant may allow for faster IC operation and improved robustness to noise. For example the signal VDD may be varied at shorter time scales while avoiding inadvertent activation of the RCESD clamp 300. For example, if the time constant of the RCESD is reduced from 1 µs to 350 ns, VDD may be charged by a power supply in 10 µs-20 µs. This may allow for faster operation of the device 100 when compared to ~50 µs for a time constant of 1 µs. Further, the device 100 may have increased noise robustness when the time constant is reduced.

In some implementations, the time constant of the RCESD clamp 300 may be reduced, but the effective RC time constant is may be increased due to the controlled deactivation by the RCCB 360. When VDD is discharged below a voltage at which the RCCB 360 runs out of headroom, the RCCB 360 may hold "nout" low, and keep the RCESD clamp 300 on. This may lead to dissipation of the ESD event with little residual charge. In some implementations the RCCB 360 may generate a reference voltage in response to transistor 336 activating.

In some cases, the RCCB 360 may not generate the reference voltage prior to transistor 336 activating to save power. In some implementations, the RCESD clamp 300 may not lock in an activate state, and may recover if falsely triggered. In some implementations, oscillations during ESD events may be minimized and/or eliminated.

In some implementations, diode 380 may allow ESD at VSS to be dissipated to VDD via unidirectional current flow via diode 380. Current may not flow from the supply path 310 to the ground path 330 via diode 380.

In the example RCESD clamp 300, transistors 334 and 336 are implemented as n-channel metal-oxide semiconductor (NMOS) and transistor 332 is implemented as p-channel metal-oxide semiconductor (PMOS). Transistors 334 and 336 may be implemented as PMOS and transistor 332 may be implemented as NMOS. The positions of the resistor 302 and the capacitor 304 may be inverted. The positions of the supply path 310 and the ground path 330 may be inverted. Other implementations may be used without departing from the architectures and principles disclosed herein.

In various implementations, the ground path 330 and VSS may include a virtual ground. For example, the VSS may be held fixed voltage less than VDD.

Figure 4:
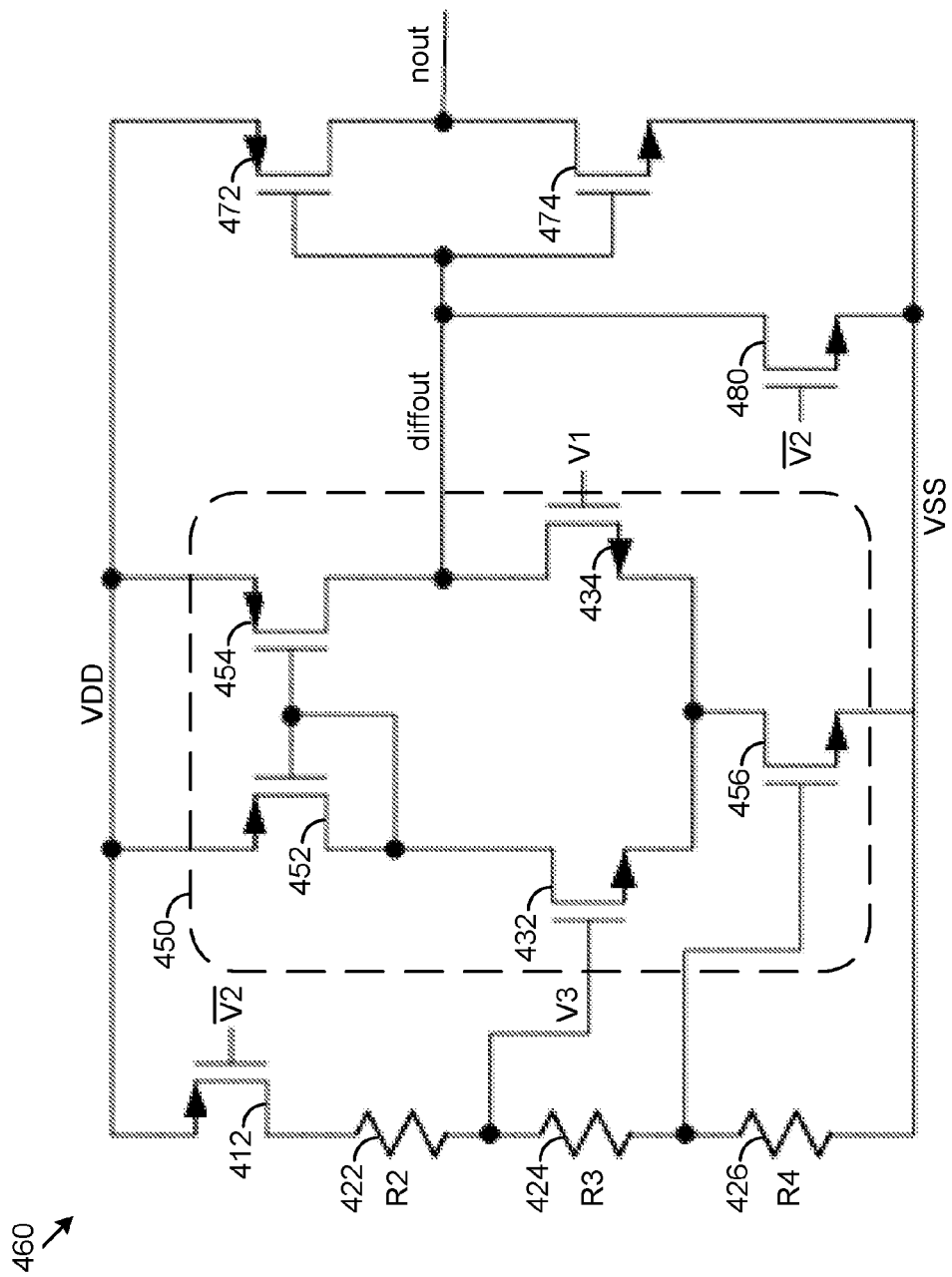
FIG. 4 shows an example reference-comparator circuit block.

FIG. 4 shows an example RCCB 460. The example RCCB 460 may accept VDD, VSS, V1 and $\overline{V2}$ as inputs from RCESD clamp 300. $\overline{V2}$ is the inverse signal of V2 from RCESD clamp 300. When V2 is high, $\overline{V2}$ may be low. Transistor 412 may be activated if $\overline{V2}$ is low. The activated transistor 412 acts as a reference generator by producing a signal (V3) at the gate of transistor 432. In some cases, V3 may act as the reference signal for the RCCB 460. V3 may be derived from V2 and/or VDD and the level of the reference V3 may adjust to the level of V2, which is the signal that activates the transistor 336 of FIG. 3. Referring again to FIG. 4, resistors 422, 424, 426 may act as voltage dividers to allow V3 to be a selected fraction of V2 and/or VDD.

The transistors 452, 454, 456, 432, 434 may act as a comparator 450 for signals V3 and V1. The comparator 450 may produce a signal (diffout) that may drive the output transistors 472, 474 of the RCCB to produce signal nout. If comparator 450 detects that V3 is greater than V1 then diffout may be pulled high. If V3 is less than V1 then diffout may be pulled low. If diffout is pulled high, transistors 472, 474 may pull nout low to keep the RCESD clamp 300 on. If diffout is pulled high, transistors 472, 474 may pull nout low to turn off the RCESD clamp 300. In some implementations, the inputs of the comparator 450 may be inverted and similar operation to that described above may be realized. For example, an additional inverter circuit may be added to the comparator 450 to allow for similar function with inverted inputs.

Transistor 480 may act as a failsafe to ensure that the RCCB 460 does not allow the RCESD clamp 300 to turn on during operation of the circuit protected by the RCESD clamp 300. Additionally or alternatively, the failsafe transistor 480 may ensure RCCB 460 does not inadvertently hold RCESD clamp 300 on after an accidental clamping or after ESD event has fully discharged. If $\overline{V2}$ is high, e.g. non-ESD operation, transistor 480 may pull diffout low. Transistor 480 may have a small transconductance. If diffout is pulled high by comparator 450 when VDD changes quickly, e.g. ESD operation, diffout may not be pulled low by transistor 480 due to its small transconductance. If VDD changes quickly the difference between V1 and VDD may be large, e.g. above a determined threshold. If VDD changes slowly, e.g. non-ESD operation, transistor 480 may pull diffout low, and comparator 450 may not overcome transistor 480 and pull diffout high.

Other RCCB circuits may be used. Virtually any control circuit which produces signal nout based on V1 and V2 as discussed with respect to RCCB 360 above may be implemented. For example, in example RCCB 460 transistors 432, 434, 456, 474, and 480 are implemented as NMOS and transistors 412, 452, and 472 are implemented as PMOS. In some implementations, Transistors 432, 434, 456, 474, and 480 may be implemented as PMOS and transistors 412, 452, and 472 may be implemented as NMOS. The positions of VDD and VSS may be inverted. Additionally or alternatively, capacitors and resistors may be realized using active devices. For example, NMOS or PMOS components may be used to perform the functions of the resistors in the ESD clamp 200, the RCESD clamp 300, and/or the RCCB 460. Multiple circuit topologies may be used to achieve the function of any of the ESD clamp 200, the RCESD clamp 300, and/or the RCCB 460. The relationships of various signals used within the ESD clamp 200, the RCESD clamp 300, and/or the RCCB 460 may be inverted. For example, a clamp may be setup to be triggered by signals falling below a threshold rather than rising above a threshold. Similarly, a negative signal difference in given implementation may have the effect as a positive signal difference in another implementation. Other implementations may be used without departing from the architectures and principles discussed herein.

Various implementations have been specifically described. However, many other implementations are also possible.

What is claimed is:

1. A device, comprising:
   an initiator path configured to provide an initiator signal;
   a supply path configured to provide a supply signal;
   a first gate transistor, coupled to the supply path and a ground path, the first gate transistor configured to clamp the supply path to the ground path responsive to a difference between the initiator signal and the supply signal;
   a second gate transistor configured to generate a gating signal for the first gate transistor responsive to the difference;
   a reference generator coupled to the first gate transistor, the reference generator configured to generate a reference signal when the supply path is clamped to the ground path; and
   a comparator configured to cause the first gate transistor to unclamp the supply path responsive to the reference signal.

2. The device of claim 1, further comprising:
   a resistor-capacitor element, coupled to the supply path and the initiator path, the resistor-capacitor element operable to cause the initiator signal to lag the supply signal.

3. The device of claim 2, where the resistor-capacitor element is configured to prevent generation of the difference in response to events that have a duration longer than a threshold duration.

4. The device of claim 3, where the resistor-capacitor element is configured to allow generation of the difference by events with a duration shorter than the threshold duration.

5. The device of claim 1, further comprising a diode coupled to the supply path and the ground path, the diode oriented to:
   allow current to flow from the ground path to the supply path; and
   prevent current flow across the diode from the supply path to the ground path.

6. The device of claim 1, further comprising a third gate transistor, coupled to the comparator and the first gate transistor, configured to modulate the gating signal responsive to an output of the comparator.

7. The device of claim 6, where the reference generator is further coupled to the second gate transistor, the reference generator further configured to generate the reference signal based on the gating signal.

8. The device of claim 7, where the reference generator is configured to generate the reference signal based on an inverse of the gating signal.

9. The device of claim 6, where the output of the comparator is configured to cause the third transistor to hold the gating signal based on a comparison of the reference signal and the initiator signal.

10. The device of claim 9, where the first transistor is configured to clamp the supply path to the ground path when the gating signal is held.

11. The device of claim 10, further comprising a failsafe transistor to prevent the hold of the gating signal when the difference is below a threshold.

12. A method, comprising:
    responsive to a difference between a supply signal and an initiator signal, clamping a supply path to a ground path;
    responsive to the clamping, generating a reference signal;
    comparing the reference signal to the initiator signal;
    responsive to comparing the reference signal to the initiator signal, holding the supply path clamped to the ground path after the supply signal and initiator signal have equilibrated; and
    unclamping the supply path to the ground path responsive to the initiator signal rising above the reference signal.

13. The method of claim 12, further comprising charging a capacitor via a resistor and the supply signal, the charging causing the initiator signal to lag the supply signal on a scale of a time constant.

14. The method of claim 12, where generating the reference signal comprises voltage dividing a gating signal that controls the clamping of the supply path to the ground path.

15. The method of claim 12, where holding the supply path clamped comprising generating at the comparator, an output that causes a transistor to prevent a gating signal that controls the clamping of the supply path to the ground path from discharging.

16. A device, comprising:

an initiator path configured to provide an initiator signal;

a supply path configured to provide a supply signal;

a resistor-capacitor element, coupled to the supply path and the initiator path, the resistor-capacitor element characterized by a time constant, the initiator signal configured to lag the supply signal;

a first gate transistor, coupled to the supply path and a ground path, the first gate transistor configured to clamp the supply path to the ground path responsive to a difference between the initiator signal and the supply signal;

a reference generator coupled to the first gate transistor, the reference generator configured to generate a reference signal when the supply path is clamped to the ground path; and a comparator configured to cause the first gate transistor to unclamp the supply path responsive to the initiator signal crossing a current level of the reference signal.

17. The device of claim 16, further comprising a second gate transistor configured to generate a gating signal for the first transistor responsive to the difference.

18. The device of claim 16, where the comparator is configured to cause the first gate transistor to hold supply path clamped to the ground path until the initiator signal and supply signal have equilibrated.

19. The device of claim 17, where reference generator is configured to generate the reference signal responsive to an inverse of the gating signal.

20. The device of claim 16, where the reference generator is configured to generate the reference signal by voltage dividing a gating signal that controls the clamping of the supply path to the ground path.

* * * * *